(12) United States Patent
Norton

(10) Patent No.: US 11,592,386 B2
(45) Date of Patent: Feb. 28, 2023

(54) LIGHT DETECTION SYSTEMS HAVING A SECONDARY LIGHT SCATTER DETECTOR AND METHODS FOR USING SAME

(71) Applicant: Becton, Dickinson and Company, Franklin Lakes, NJ (US)

(72) Inventor: Pierce O. Norton, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 128 days.

(21) Appl. No.: 17/178,829

(22) Filed: Feb. 18, 2021

(65) Prior Publication Data

US 2021/0262914 A1 Aug. 26, 2021

Related U.S. Application Data

(60) Provisional application No. 62/981,932, filed on Feb. 26, 2020.

(51) Int. Cl.
*G01N 15/14* (2006.01)
*G01N 15/00* (2006.01)

(52) U.S. Cl.
CPC ..... *G01N 15/1434* (2013.01); *G01N 15/1429* (2013.01); *G01N 2015/0065* (2013.01); *G01N 2015/149* (2013.01)

(58) Field of Classification Search
CPC .......... G01N 15/1434; G01N 15/1429; G01N 2015/0065; G01N 2015/149
See application file for complete search history.

(56) References Cited

U.S. PATENT DOCUMENTS

| 5,909,278 | A | * | 6/1999 | Deka | ..................... G01J 3/4406 356/73 |
|---|---|---|---|---|---|
| 2006/0238757 | A1 | | 10/2006 | Silcott | |
| 2009/0190822 | A1 | | 7/2009 | Orytn et al. | |
| 2018/0284010 | A1 | * | 10/2018 | Scarcelli | ................... G01J 3/44 |
| 2019/0204207 | A1 | * | 7/2019 | Chandler | ........... G01N 21/6402 |
| 2019/0219509 | A1 | | 7/2019 | Lo et al. | |
| 2021/0041342 | A1 | * | 2/2021 | Tahara | ................. G01N 33/582 |

FOREIGN PATENT DOCUMENTS

| JP | 2013015357 A | 1/2013 |
|---|---|---|
| KR | 20180032080 A | 3/2018 |

\* cited by examiner

*Primary Examiner* — Michael McCullough
*Assistant Examiner* — Jessica L Burkman
(74) *Attorney, Agent, or Firm* — Peter W. Schroen; Bret E. Field; Bozicevic, Field & Francis LLP

(57) ABSTRACT

Systems having an unfiltered light scatter detector configured to detect scattered light from a sample in a flow stream are provided. Systems according to certain embodiments include a light source having two or more lasers, a light detection system having an unfiltered light scatter detector and a processor having memory operably coupled to the processor where the memory includes instructions which when executed by the processor, cause the processor to generate one or more data signals in response to scattered light from each of the two or more lasers detected by the unfiltered light scatter detector; and determine one or more parameters of data acquisition based on the generated data signals from the unfiltered light scatter detector. Methods for determining one or more parameters for data acquisition with the subject systems are also described.

18 Claims, 11 Drawing Sheets

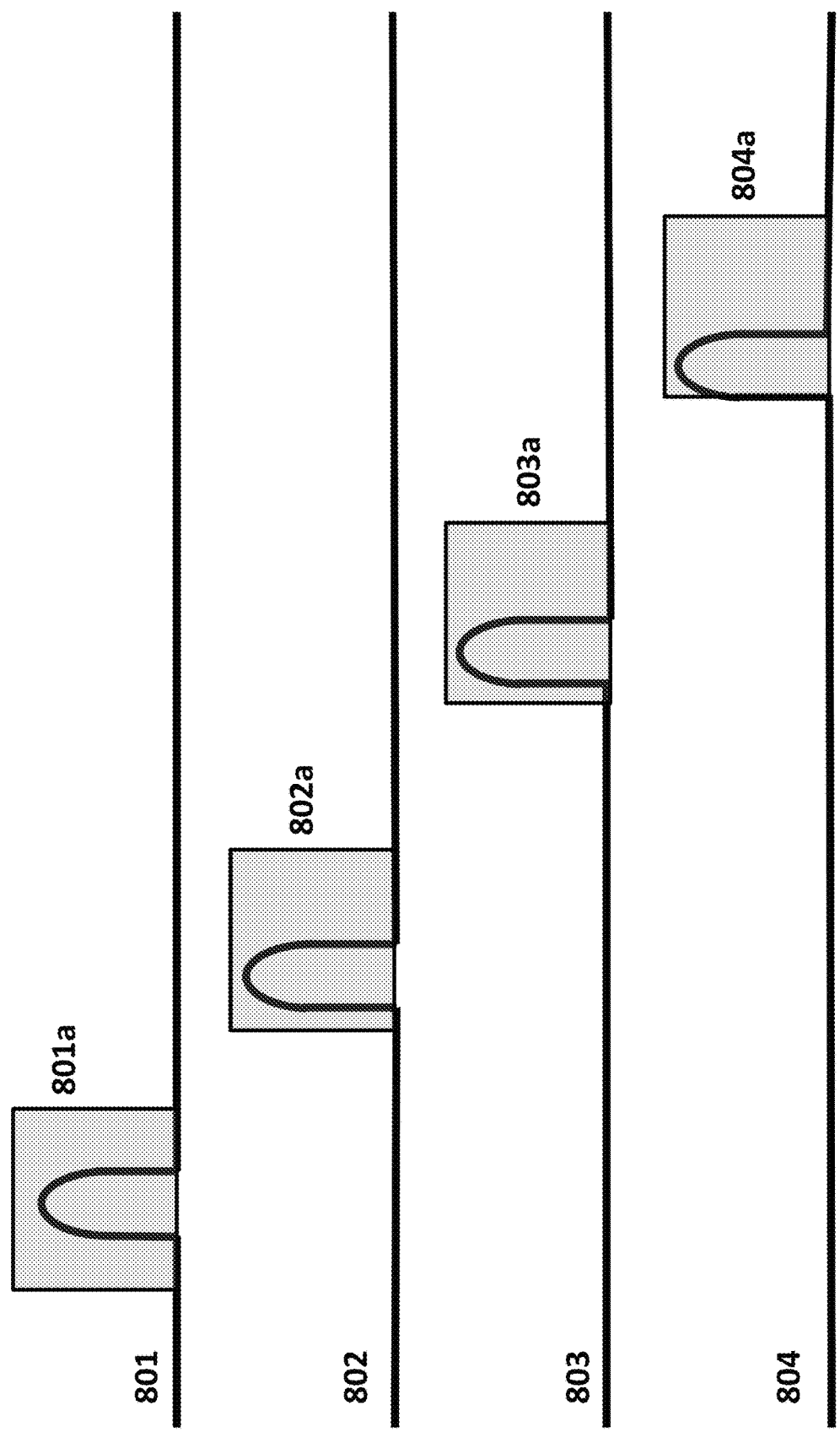

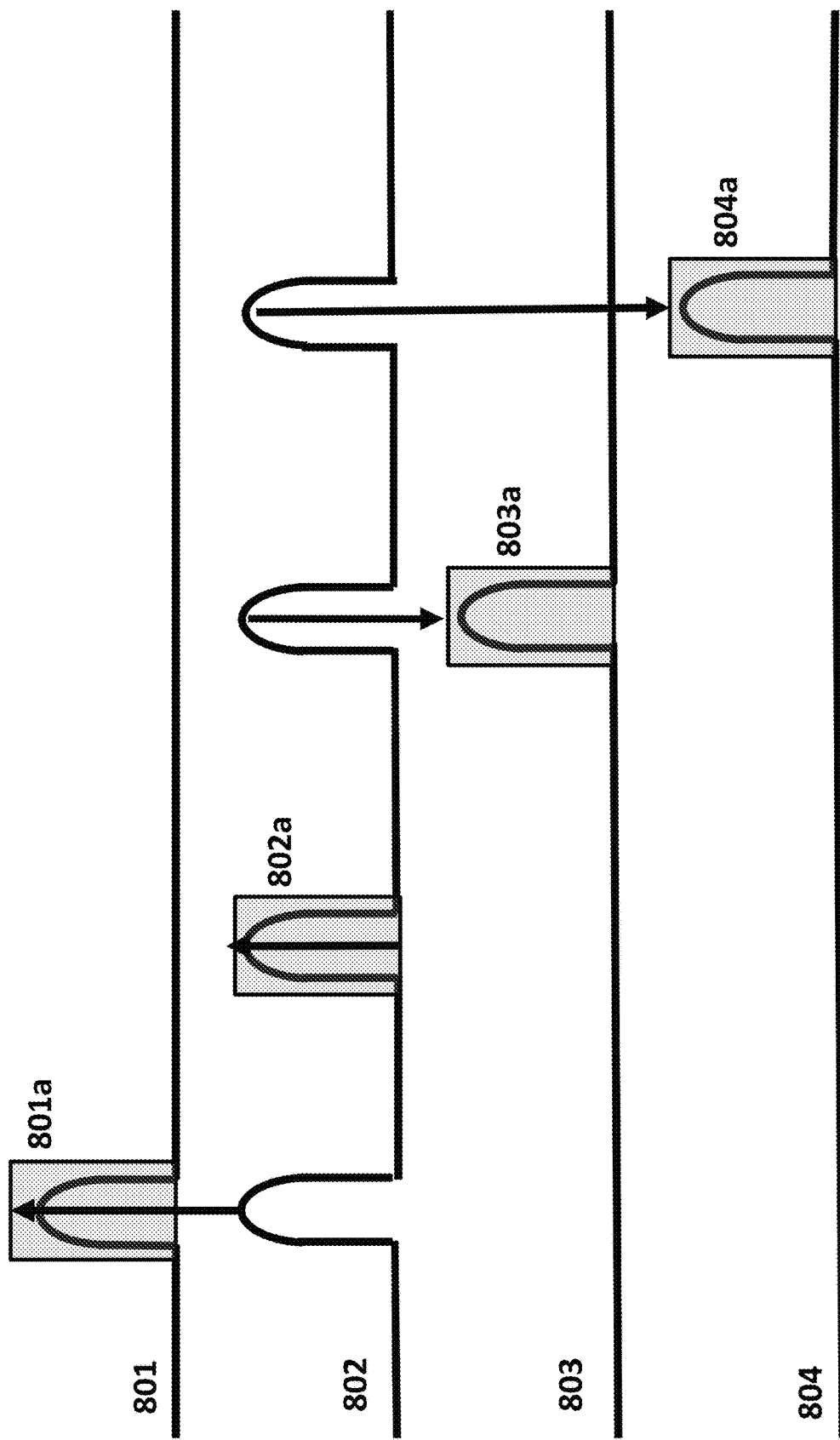

LIGHT DETECTION SYSTEMS HAVING A SECONDARY LIGHT SCATTER DETECTOR AND METHODS FOR USING SAME

CROSS-REFERENCE TO RELATED APPLICATION

This application is related to U.S. Provisional Patent Application Ser. No. 62/981,932 filed Feb. 26, 2020; the disclosure of which application is herein incorporated by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered by the sample. To quantify these variations, the light is collected and directed to the surface of a detector.

One technique that utilizes light detection to characterize the components in a sample is flow cytometry. Using data generated from the detected light, properties of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include systems having an unfiltered light scatter detector configured to detect scattered light from a sample in a flow stream. Systems according to certain embodiments include a light source having two or more lasers, a light detection system having an unfiltered light scatter detector and a processor having memory operably coupled to the processor where the memory includes instructions which when executed by the processor, cause the processor to generate one or more data signals in response to scattered light from each of the two or more lasers detected by the unfiltered light scatter detector; and determine one or more parameters of data acquisition based on the generated data signals from the unfiltered light scatter detector. In some embodiments, one or more parameters of data acquisition includes the timing of particle irradiation by each of the two or more lasers. In certain instances, systems include memory having instructions to adjust one or more parameters of data acquisition based on the generated data signals from the unfiltered light scatter detector. For instance, the duration of data acquisition may be adjusted (e.g., decrease duration of data acquisition). In other embodiments, one or more parameters of data acquisition includes parameters for identifying a position of a particle in the flow stream in response to the generated data signals from the unfiltered light scatter detector. In certain embodiments, systems include memory having instructions for generating one or more particle sorting parameters in response to the data signals from the unfiltered light scatter detector. In some instances, the particle sorting parameter is particle sort timing.

In embodiments, systems include a light detection system having an unfiltered light scatter detector configured to detect scattered light from a sample in a flow stream irradiated by the two or more lasers. In some embodiments, the light scatter detector is a side scatter photodetector. In other embodiments, the light scatter detector is a forward scatter photodetector. In other embodiments, the light scatter detector is a back scatter photodetector. The subject light detection systems may further include a filtered light scatter detector. In some instances, the filtered light scatter detector is configured to detect light scattered by the sample in the flow stream from one of the lasers of the light source. In certain instances, the filtered light scatter detector includes a light scatter detector and an optical adjustment component (e.g., a bandpass filter, dichroic mirror) that is configured to convey light scattered by the sample from the one laser to the light scatter detector. In the light detection system, an optical adjustment component may be positioned in an optical path between the filtered light scatter detector and the unfiltered light scatter detector, such as where the optical adjustment component (e.g., beam splitter) is configured to convey the scattered light from the sample to the unfiltered light scatter detector and to the filtered light scatter detector.

Aspects of the present disclosure also include methods for determining one or more parameters of data acquisition based on generated data signals from an unfiltered light scatter detector. Methods according to certain embodiments include detecting light from a flow stream with a light detection system comprising an unfiltered light scatter detector configured to detect scattered light from a sample in a flow stream irradiated by two or more lasers; generating one or more data signals in response to scattered light from each of the two or more lasers detected by the unfiltered light scatter detector; and determining one or more parameters of data acquisition based on the generated data signals from the unfiltered light scatter detector. In some embodiments, the parameter determined based on the generated data signals from the unfiltered light scatter detector is timing of particle irradiation. In other embodiments, the parameter determined based on the generated data signals from the unfiltered light scatter detector is a particle sorting parameter, such as particle sort timing. In certain embodiments, methods further include adjusting one or more parameters based on the generated data signals from the unfiltered light scatter detector, such as adjusting the irradiation timing, the data acquisition duration or timing of particle sorting.

Aspects of the present disclosure also include kits, where kits include two or more light scatter detectors, an optical filtering component and an optical adjustment component to convey light to each of the light scatter detectors. Kits may further include other optical adjustment components, such as obscuration components including optical apertures, slits and obscuration discs and scatter bars.

BRIEF DESCRIPTION OF THE FIGURES

The invention may be best understood from the following detailed description when read in conjunction with the accompanying drawings. Included in the drawings are the following figures:

FIGS. 8A and 8B illustrate adjusting data acquisition using a data signal from an unfiltered light scatter detector according to certain embodiments. FIG. 8A depicts the misalignment of time-shifting laser pulses with data acquisition windows due to changes in particle flow rate according to certain embodiments.

FIG. 8B depicts the realignment of data acquisition windows using an unfiltered light scatter detector according to certain embodiments.

DETAILED DESCRIPTION

Figure 1:
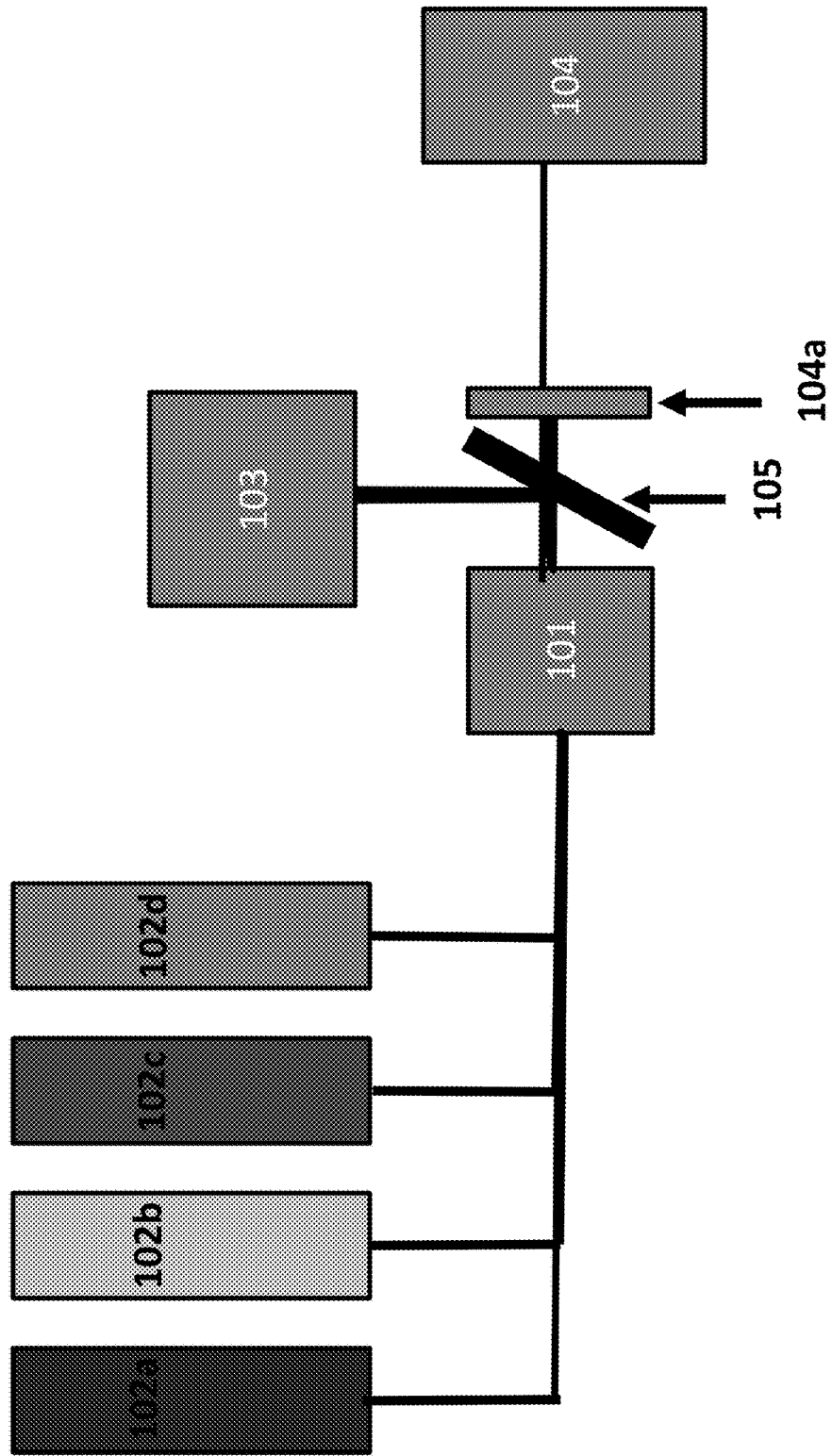
FIG. 1 depicts an arrangement of components of a light detection system according to certain embodiments.

Systems having an unfiltered light scatter detector configured to detect scattered light from a sample in a flow stream are provided. Systems according to certain embodiments include a light source having two or more lasers, a light detection system having an unfiltered light scatter detector and a processor having memory operably coupled to the processor where the memory includes instructions which when executed by the processor, cause the processor to generate one or more data signals in response to scattered light from each of the two or more lasers detected by the unfiltered light scatter detector; and determine one or more parameters of data acquisition based on the generated data signals from the unfiltered light scatter detector. Methods for determining one or more parameters for data acquisition with the subject systems are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, systems having an unfiltered light scatter detector configured to detect scattered light from a sample in a flow stream are provided. In further describing embodiments of the disclosure, systems having a light source with two or more lasers and a light detection system that includes an unfiltered light scatter detector are described first in greater detail. Next, systems and methods for determining and adjusting one or more parameters of data acquisition based on generated data signals from the unfiltered light scatter detector are described. Kits having one or more components of the subject light detection systems are also provided.

Light Detection Systems

Aspects of the present disclosure include light detection systems having an unfiltered light scatter detector configured to detect scattered light from a sample in a flow stream irradiated by two or more lasers. The term "light scatter" is used herein in its conventional sense to refer to the propagation of light energy from particles in the sample (e.g., flowing in a flow stream) that are deflected from the incident beam path, such as by reflection, refraction or deflection of the beam of light. In some embodiments, scattered light is not luminescence from a component of the particle (e.g., a fluorophore). In embodiments, scattered light according to the present disclosure is not fluorescence or phosphorescence. In certain embodiments, scattered light detected by scatter photodetectors of the subject systems includes Mie scattering by particles in the flow stream. In other embodiments, scattered light detected by scatter photodetectors of the subject systems includes Rayleigh scattering by particles in the flow stream. In still other embodiments, scattered light detected by scatter photodetectors of the subject systems includes Mie scattering and Rayleigh scattering by particles in the flow stream. The scatter photodetectors may be side scatter photodetectors, forward scatter photodetectors, back scatter photodetectors and combinations thereof.

Light detection systems according to embodiments include an unfiltered light scatter detector. The term "unfiltered" is used herein to refer to a light scatter detector which receives light from a sample that has not been conveyed through an optical component that is configured to restrict, reduce or otherwise limit the propagation of one or more wavelengths of the light (e.g., the wavelengths of the light of the lasers used to irradiate the sample) from the sample to the active surface of the light scatter detector. For example, in some embodiments, unfiltered light scatter detectors of interest are not in optical communication with the sample through a bandpass filter. In other embodiments, unfiltered light scatter detectors of interest are not in optical communication with the sample through a dichroic mirror. In certain instances, scattered light from the sample is conveyed directly to the active surface of the unfiltered light scatter detector. In other instances, scattered light from the sample is conveyed to the active surface of the unfiltered light scatter detector through one or more light propagating optical components, such as optical components which change the direction or focus of the light beam without reducing, restricting or limiting the propagation of one or more wavelengths of the light. In certain embodiments, scattered light from the sample is conveyed to the active surface of the unfiltered light scatter detector using one or more beam splitters, mirrors, lenses or collimators.

As described in greater detail below, scattered light is detected by the unfiltered light scatter detector from a sample that is irradiated with a light source having 2 or more lasers, such as 3 or more lasers, such as 4 or more lasers, such as 5 or more lasers, such as 10 or more laser, such as 15 or more lasers, such as 25 or more lasers and including 50 or more lasers. In embodiments, light scattered by the sample from two or more of the lasers of the light source is detected by the unfiltered light scatter detector, such as from 3 or more of the lasers, such as from 4 or more of the lasers, such as from 5 or more of the lasers, such as from 10 or more of the lasers, such as from 15 or more of the lasers and including light scattered by the sample from 25 or more of the lasers of the light source. In certain embodiments, the unfiltered light scatter detector is configured to detect light scattered by the sample from 50% or more of the lasers of the light source (e.g., 2 lasers out of 4 total lasers), such as from 60% or more, such as 70% or more, such as 75% or more, such as 80% or more and including 90% or more of the lasers of the light source. In certain instances, the unfiltered light scatter detector is configured to detect light scattered by the sample from all of the lasers of the light source.

In some embodiments, light detection systems include one or more filtered light scatter detectors. The term "filtered" is used herein to refer to a light scatter detector which receives light from a sample that has been conveyed through an optical component that is configured to restrict, reduce or limit the propagation of at least one or more wavelengths of the light (e.g., one or more of the wavelengths of the light of the lasers used to irradiate the sample) from the sample to the active surface of the light scatter detector. The light conveyed to the light scatter photodetector may include an optical component that limits the propagation of one or more different wavelengths of light, such as 5 or more, such as 10 or more, such as 25 or more, such as 50 or more, such as 100 or more, such as 200 or more, such as 300 or more and including limiting the propagation of 500 or more different wavelengths of light. For example, in some embodiments, scattered light from the sample is conveyed to the active surface of the filtered light scatter detector through a bandpass filter. In other embodiments, scattered light from the sample is conveyed to the active surface of the filtered light scatter detector through a dichroic mirror.

Depending on the number of lasers being used to irradiate the sample, in some embodiments filtered light scatter detectors are configured to detect light scattered by the sample from 5 or fewer lasers, such as 4 or fewer lasers, such as 3 or fewer lasers and including 2 or fewer lasers. In certain instances, the filtered light scatter detector is configured to detect light scattered by the sample from one of the lasers of the light source. For instance, the filtered light scatter detector may be configured to detect light scattered by 50% or fewer of the lasers (e.g., 2 lasers out of 4 total lasers) of the light source, such as 40% or fewer, such as 30% or fewer, such as 25% or fewer, such as 20% or fewer and including 10% or fewer of the lasers of the light source. In certain instances, the filtered light scatter detector is configured to detect light scattered by a single laser.

Scattered light may be detected by each photodetector at an angle with respect to the incident beam of light irradiation, such as at an angle of 1° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light detector is configured to detect light from particles in the sample at an angle that is 180° or more with respect to the incident beam of light irradiation. In certain instances, one or more of the filtered and unfiltered light scatter detectors is a side scatter photodetector, such as where the photodetector is positioned to detect scattered light that is propagated from 30° to 120° with respect to the incident beam of light irradiation, such as from 45° to 105° and including from 60° to 90°. In certain instances, one or more of the filtered and unfiltered light scatter detectors is a side scatter photodetector positioned at an angle of 90° with respect to the incident beam of light irradiation. In other instances, one or more of the filtered and unfiltered light scatter detector is a forward scatter detector, such as where the detector is positioned to detect scattered light that is propagated from 120° to 240° with respect to the incident beam of light irradiation, such as from 100° to 220°, such as from 120° to 200° and including from 140° to 180° with respect to the incident beam of light irradiation. In certain instances, one or more of the filtered and unfiltered light scatter detectors is a front scatter photodetector positioned to detect scattered light that is propagated at an angle of 180° with respect to the incident beam of light irradiation. In yet other instances, one or more of the filtered and unfiltered light scatter detectors is a back scatter photodetector positioned to detect scattered light that is propagated from 1° to 30° with respect to the incident beam of light irradiation, such as from 5° to 25° and including from 10° to 20° with respect to the incident beam of light irradiation. In certain instances, one or more of the filtered and unfiltered light scatter detectors is a back scatter photodetector positioned to detect scattered light that is propagated at an angle of 30° with respect to the incident beam of light irradiation.

Each light scatter photodetector in the subject light detection systems may be any suitable photosensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the light scatter photodetector may include 1 or more photosensor, such as 2 or more, such as 3 or more, such as 5 or more, such as 10 or more and including 25 or more photosensors. In some instances, each light scatter photodetector is a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a light scatter photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

The light scatter photodetector of the present disclosure are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, the subject photodetectors are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from a sample in the flow stream at one or more specific wavelengths. In embodiments, the light detection system is configured to measure light continuously or in discrete intervals. In some instances, detectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, light detection systems include an unfiltered light scatter detector, a filtered light scatter detector and an optical adjustment component positioned in an optical path between the unfiltered light scatter detector and filtered light scatter detector that is configured to convey scattered light from the sample to the unfiltered light scatter detector and to the filtered light scatter detector. In certain embodiments, optical adjustment includes splitting the beam of light such that part of the collected light (light scattered by the sample in the flow stream) is conveyed to the unfiltered light scatter detector and another part of the collected light is conveyed to the filtered light scatter detector.

In some embodiments, the optical adjustment component is a beam splitter. The amount of light propagated to each light scatter photodetector through the optical adjustment component may also vary, where in some embodiments, 50% or more of the collected light is conveyed to the light scatter photodetectors, such as 55% or more, such as 60% or more, such as 65% or more, such as 75% or more, such as 80% or more, such as 90% or more and including 95% or more of the light collected by the subject light detection system is conveyed to each light scatter photodetector through the optical adjustment component. For example, the amount of light propagated to each light scatter photodetector through the optical adjustment component may range from 25% to 99%, such as from 30% to 95%, such as from 35% to 90%, such as from 40% to 85%, such as from 45% to 80% and including from 50% to 75%.

In some embodiments 50% or less of the collected light is conveyed to the filtered light scatter photodetector through the optical adjustment component, such as 45% or less, such as 40% or less, such as 35% or less, such as 30% or less, such as 25% or less, such as 20% or less, such as 15% or less, such as 10% or less and including 5% or less of the light collected by the light detection system is conveyed to the filtered light scatter photodetector through the optical adjustment component. For example, the amount of collected light that is propagated through the optical adjustment component to the filtered light scatter photodetector may range from 1% to 75%, such as from 2% to 70%, such as from 3% to 65%, such as from 4% to 60% and including from 5% to 50%. In other embodiments, 50% or less of the collected light is conveyed to the unfiltered light scatter photodetector through the optical adjustment component, such as 45% or less, such as 40% or less, such as 35% or less, such as 30% or less, such as 25% or less, such as 20% or less, such as 15% or less, such as 10% or less and including 5% or less of the light collected by the light detection system is conveyed to the unfiltered light scatter photodetector through the optical adjustment component. For example, the amount of collected light that is propagated through the optical adjustment component to the unfiltered light scatter photodetector may range from 1% to 75%, such as from 2% to 70%, such as from 3% to 65%, such as from 4% to 60% and including from 5% to 50%.

In some embodiments, the optical adjustment component is a beamsplitter. The term "beamsplitter" is used herein in its conventional sense to refer to the optical component that is configured to propagate light along two or more different optical paths, such that a predetermined portion of the light is propagated along each optical path. Any convenient light beamsplitting protocol may be employed such as with triangular prism, slivered mirror prisms, dichroic mirror prisms, among other types of beamsplitters. The beamsplitter may be formed from any suitable material so long as the beamsplitter is capable of propagating the desired amount and wavelengths of light to the unfiltered light scatter detector and filtered light scatter detector. For example, beamsplitters of interest may be formed from glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In certain embodiments, the beamsplitter is formed from a polymeric material, such as, but not limited to, polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials. In certain embodiments, the beamsplitter is formed from a polyester, where polyesters of interest may include, but are not limited to, poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly(hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly(ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediylalkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly(tetramethylglycolide), and poly(lactide-co-glycolide); and polycarbonates of bisphenol A, 3,3'-dimethylbisphenol A, 3,3',5,5'-tetrachlorobisphenol A, 3,3', 5,5'-tetramethylbisphenol A; polyamides such as poly(p-phenylene terephthalamide); polyethylene Terephthalate (e.g., Mylar™ Polyethylene Terephthalate), combinations thereof, and the like.

In certain embodiments, the optical adjustment component is a wedged beamsplitter. In these embodiments, the beamsplitter is a beamsplitter having a wedge angle that produces non-collinear back reflection such that propagation of collected light through the wedged beamsplitter results in a small change in the angle of light propagated to one or more of the unfiltered light scatter detector and filtered light scatter detector. Wedged beamsplitters according to embodiments of the present disclosure have a wedge angle where a change in the incident angle of collected light results in a deviation in the propagated light angle by 0.001% or more, such as by 0.005% or more, such as by 0.01% or more, such as by 0.05% or more, such as by 0.1% or more, such as by 0.5% or more, such as by 1% or more, such as by 2% or more, such as by 3% or more, such as by 5% or more and including by 10% or more. In some embodiments, the wedged beamsplitter has a wedge angle of from 5 arc minute to 120 arc minute, such as from 10 arc minute to 115 arc minute, such as from 15 arc minute to 110 arc minute, such as from 20 arc minute to 105 arc minute, such as from 25 arc minute to 100 arc minute, such as from 30 arc minute to 105 arc minute, such as from 35 arc minute to 100 arc minute, such as from 40 arc minute to 95 arc minute and including from 45 arc minute to 90 arc minute. In certain embodiments, the wedged beamsplitter has a wedge angle that is sufficient to reduce or eliminate light interference. In other embodiments, the wedged beamsplitter has a wedge angle that is sufficient to reduce or eliminate image artifacts from the measured light by the unfiltered light scatter detector or the filtered light scatter detector.

In some embodiments, the wedged beamsplitter has a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 μm to 8 μm, from 2 μm to 16 μm or some other wavelength range.

Beamsplitters of interest may be configured to split the amount of light propagated to the unfiltered light scatter detector and the filtered light scatter detector as desired. In some embodiments, the beamsplitter has a beam splitting light ratio between the unfiltered light scatter detector and filtered light scatter detector of from 1:99 to 99:1, such as from 5:95 to 95:5, such as from 10:90 to 90:10, such as from 20:80 to 80:20 and including from 25:75 to 75:25. In other embodiments, the beamsplitter has a beam splitting light ratio between the filtered light scatter detector and unfiltered light scatter detector of from 1:99 to 99:1, such as from 5:95 to 95:5, such as from 10:90 to 90:10, such as from 20:80 to 80:20 and including from 25:75 to 75:25. In certain embodiments, In some embodiments, the spatial position of the beamsplitter is adjustable, such as manually (by hand) or with a motor-driven displacement device. For example, the angle of the beamsplitter may be adjusted in the subject light detection system by 5° or more, such as by 10° or more, such as by 15° or more, such as by 20° or more, such as by 30° or more, such as by 45° or more, such as by 60° or more and including by 75° or more. In certain instances, the spatial position of the beamsplitter can be adjusted in the light detection system, such as by 1 mm or more, such as by 5 mm or more, such as by 10 mm or more and including by 25 mm or more. Any convenient motor-driven actuator can be used, such as for example a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors. In one example, the horizontal or vertical position or the angle of orientation of the beamsplitter can be adjusted with a motor-driven displacement device.

FIG. 1 depicts an arrangement of components of a light detection system according to certain embodiments. Light detection system 100 includes a flow cell 101 that is irradiated with a light source 102 having lasers 102a, 102b, 102c and 102d. Light scattered by particles in the sample from lasers 102a, 102b, 102c and 102d is conveyed to unfiltered light scatter detector 103 (a forward light scatter detector) and to filtered light scatter detector 104 using beam splitter 105. Light from beam splitter 105 is conveyed to filtered light scatter detector 104 through a bandpass filter 104a which is configured to restrict the propagation of light from lasers 102a, 102b and 102c and is configured to only convey scattered light from laser 102d to light scatter detector 104.

In some embodiments, light from the optical adjustment component is propagated through an obscuration component to one or more of the unfiltered light scatter detector and the filtered light scatter detector. In these embodiments, the obscuration component is configured to reduce the amount of light that is conveyed to the detector, such as reducing the amount of light that is conveyed by 1% or more, such as by 5% or more, such as by 10% or more, such as by 25% or more, such as by 40% or more and including reducing the amount of light that is conveyed by 50% or more. Any convenient obscuration protocol may be employed, including but not limited to optical apertures (e.g., pinholes) or slits. The size of the optical aperture may vary as desired, where apertures of interest range from 0.001 mm to 10 mm, such as from 0.005 mm to 9.5 mm, such as from 0.01 mm to 9 mm, such as from 0.05 mm to 8.5 mm, such as from 0.1 mm to 8 mm, such as from 0.5 mm to 7.5 mm and including from 1 mm to 5 mm. Obscuration slits of interest may also vary where the width of the slit ranges from 0.001 mm to 10 mm, such as from 0.005 mm to 9.5 mm, such as from 0.01 mm to 9 mm, such as from 0.05 mm to 8.5 mm, such as from 0.1 mm to 8 mm, such as from 0.5 mm to 7.5 mm and including from 1 mm to 5 mm. The length of the obscuration slit may vary depending on the width of propagated light to the light scatter detectors and may range from 1 mm to 50 mm, such as from 2 mm to 45 mm, such as from 3 mm to 40 mm, such as from 4 mm to 35 mm and including from 5 mm to 25 mm.

The obscuration component employed to reduce the amount of light conveyed to the light scatter detector may be any convenient shape where cross-sectional shapes of interest include, but are not limited to rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the obscuration component is a circle. In other embodiments, the obscuration component is an oval. In yet other embodiments, the obscuration component is polygonal-shaped, such as square-shaped or rectangular. The width of the obscuration component may vary, ranging in some instances from 1 mm to 25 mm, such as from 2 mm to 22 mm, such as from 3 mm to 20 mm, such as from 4 mm to 17 mm and including from 5 mm to 15 mm. The length of each obscuration component ranges from 1 mm to 50 mm, such as from 2 mm to 45 mm, such as from 3 mm to 40 mm, such as from 4 m to 35 mm, such as from 5 mm to 30 mm and including from 10 mm to 20 mm.

In some embodiments, light received by the subject light detection system may be conveyed by an optical collection system. The optical collection system may be any suitable light collection protocol that collects and directs the light. In some embodiments, the optical collection system includes fiber optics, such as a fiber optics light relay bundle. In other embodiments, the optical collection system is a free-space light relay system.

In embodiments, the optical collection system may be physically coupled to the light detection system, such as with an adhesive, co-molded together or integrated into the light detection system. In certain embodiments, the optical collection system and light detection system are integrated into a single unit. In some instances, the optical collection system is coupled to the light detection system with a connector that fastens the optical collection system to the light detection system, such as with a hook and loop fasteners, magnets, latches, notches, countersinks, counterbores, grooves, pins, tethers, hinges, Velcro, non-permanent adhesives or a combination thereof.

In other embodiments, the light detection system and the optical collection system are in optical communication, but are not physically in contact. In embodiments, the optical collection system may be positioned 0.001 mm or more from the light detection system, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In certain embodiments, the optical collection system includes fiber optics. For example, the optical collection system may be a fiber optics light relay bundle and light is conveyed through the fiber optics light relay bundle to the light detection system. Any fiber optics light relay system may be employed to propagate light to the light detection system. In certain embodiments, suitable fiber optics light relay systems for propagating light to the light detection system include, but are not limited to, fiber optics light relay systems such as those described in U.S. Pat. No. 6,809,804, the disclosure of which is herein incorporated by reference.

In other embodiments, the optical collection system is a free-space light relay system. The phrase "free-space light relay" is used herein in its conventional sense to refer to light propagation that employs a configuration of one or more optical components to direct light to the light detection system through free-space. In certain embodiments, the free-space light relay system includes a housing having a proximal end and a distal end, the proximal end being coupled to the light detection system. The free-space relay system may include any combination of different optical adjustment components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the light detection system, but are not limited to, light relay systems such as those described in U.S. Pat. Nos. 7,643,142; 7,728,974 and 8,223,445, the disclosures of which is herein incorporated by reference.

As summarized above, aspects of the present disclosure also include systems for measuring scattered light from a sample. Systems according to certain embodiments include a light source having two or more lasers, a light detection system that includes an unfiltered light scatter detector as described hereinabove and a processor having memory operably coupled to the processor where the memory includes instructions stored thereon, which when executed by the processor, cause the processor to: generate one or more data signals in response to scattered light from each of the two or more lasers detected by the unfiltered light scatter detector; and determine one or more parameters of data acquisition based on the generated data signals from the unfiltered light scatter detector.

In embodiments, the light source includes two or more lasers, such as 3 or more lasers, such as 4 or more lasers, such as 5 or more lasers, such as 10 or more laser, such as 15 or more lasers, such as 25 or more lasers and including 50 or more lasers. Depending on the components in the sample (e.g., cells, beads, non-cellular particles, etc.), the lasers may emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. Each laser may independently be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, light scattered by particles in the sample from the light source is detected by the unfiltered light scatter detector. In some embodiments, systems include a processor with memory operably coupled to the processor where the memory includes instructions stored thereon, which when executed by the processor, cause the processor to generate one or more data signals in response to scattered light from each of the two or more lasers detected by the unfiltered light scatter detector; and determine one or more parameters of data acquisition based on the generated data signals from the unfiltered light scatter detector.

In some embodiments, the one or more parameters of data acquisition determined based on the generated data signals from the unfiltered light scatter detector includes timing of data acquisition by one or more photodetectors in the subject systems. For example, the timing for data acquisition by one or more other light scatter detectors, emission photodetectors, transmission photodetectors, flow stream imaging sensors may be determined using the generated data signals from the unfiltered light scatter detector. In some embodiments, the one or more parameters of data acquisition determined based on the generated data signals from the unfiltered light scatter detector includes identifying the position of a particle in the flow stream. In other embodiments, the one or more parameters of data acquisition determined based on the generated data signals from the unfiltered light scatter detector includes the duration between light scatter by particles in the sample from each laser. In other embodiments, the one or more parameters of data acquisition determined based on the generated data signals from the unfiltered light scatter detector includes changes in the flow rate by particles in the sample. In certain instances, systems include memory having instructions for generating one or more particle sorting parameters in response to the data signals from the unfiltered light scatter detector. In some instances, the particle sorting parameter is particle sort timing, such as timing for charging a particle-containing droplet.

In certain instances, systems include memory having instructions to adjust one or more parameters of data acquisition based on the generated data signals from the unfiltered light scatter detector. In some embodiments, systems include memory having instructions for changing the duration of data acquisition (i.e., data acquisition window). In some instances, the memory includes instructions for decreasing the duration of data acquisition by 5% or more, such as by 10% or more, such as by 25% or more and including by decreasing the duration of data acquisition by 50% or more.

For example, the duration of data acquisition may be decreased by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more and including by 5 µs or more.

In other embodiments, systems include memory having instructions for changing the timing of data acquisition. In some instances, the memory includes instructions for adjusting the timing of data acquisition 5% or more, such as by 10% or more, such as by 25% or more and including adjusting the timing of data acquisition by 50% or more. For example, the timing of data acquisition may be adjusted by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 us or more and including by 5 us or more.

In certain embodiments, systems include memory having instructions for adjusting one or more particle sorting parameters in response to the data signals from the unfiltered light scatter detector. In some instances, the memory includes instructions for adjusting the particle sort timing, such as the timing for charging a particle-containing droplet. In certain instances, the memory includes instructions for adjusting the timing of charging a particle-containing droplet by 5% or more, such as by 10% or more, such as by 25% or more and including adjusting the timing of charging a particle-containing droplet by 50% or more. For example, the timing of charging a particle-containing droplet may be adjusted by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more and including by 5 µs or more.

In still other embodiments, the memory includes instructions to adjust the drop drive frequency in response to the generated data signals from the unfiltered light scatter detector. In some instances, the drop drive frequency is increased, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be increased by 1% or more, such as by 5% or more, such as by 10% or more, such as by 15% or more, such as by 25% or more, such as by 50% or more, such as by 75% or more and including increasing the drop drive frequency by 90% or more. In other instances, the drop drive frequency is reduced, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be reduced by 1% or more, such as by 5% or more, such as by 10% or more, such as by 15% or more, such as by 25% or more, such as by 50% or more, such as by 75% or more and including reducing the drop frequency by 90% or more.

In still other embodiments, the memory includes instructions to adjust the drop delay in response to the generated data signals from the unfiltered light scatter detector. In some instances, the drop delay is increased, such as by 0.01 µs or more, such as by 0.05 µs or more, such as by 0.1 µs or more, such as by 0.3 µs or more, such as by 0.5 µs or more, such as by 1 µs or more, such as by 2.5 µs or more, such as by 5 µs or more, such as by 7.5 µs or more and including increasing the drop delay by 10 µs or more. For example, the drop delay may be increased by 1% or more, such as by 5% or more, such as by 10% or more, such as by 15% or more, such as by 25% or more, such as by 50% or more, such as by 75% or more and including increasing the drop delay by 90% or more. In other instances, the drop frequency is reduced, such as by 0.01 µs or more, such as by 0.05 µs or more, such as by 0.1 µs or more, such as by 0.3 µs or more, such as by 0.5 µs or more, such as by 1 µs or more, such as by 2.5 µs or more, such as by 5 µs or more, such as by 7.5 µs or more and including reducing the drop delay by 10 µs or more. For example, the drop delay may be reduced by 1% or more, such as by 5% or more, such as by 10% or more, such as by 15% or more, such as by 25% or more, such as by 50% or more, such as by 75% or more and including reducing the drop delay by 90% or more.

In certain embodiments, systems further include a flow cell configured to propagate the sample in the flow stream. In some instances, the unfiltered light scatter detector is configured to detect light scattered by the sample from one or more lasers that are configured to irradiate at or near the distal end of the flow cell. In certain instances, the laser is configured to irradiate at a position that is from 0.0001 µm to 10 µm from the distal end of the flow cell, such as from 0.0005 µm to 9.5 µm, such as from 0.001 µm to 9 µm, such as from 0.005 µm to 8.5 µm, such as from 0.01 µm to 8 µm, such as from 0.05 µm to 7.5 µm, such as from 0.1 µm to 7 µm and including from 0.5 µm to 5 µm from the distal end of the flow cell. In some embodiments, the system is configured to use the data signal from a light scatter detector that detects scattered light from the sample irradiated at the distal end of the flow cell to adjust one or more parameters as described above. In certain instances, the data signal from this light scatter detector is used to adjust one or more particle sorting parameters, such as particle sort timing. In certain embodiments, using the data signal from a light scatter detector that detects scattered light from the sample irradiated at the distal end of the flow cell is sufficient to offset flow rate gradients across the flow stream, such as where particles flowing at or near the center of the flow stream travel faster than particles flowing at or near the outer edges of the flow stream.

Figure 2:
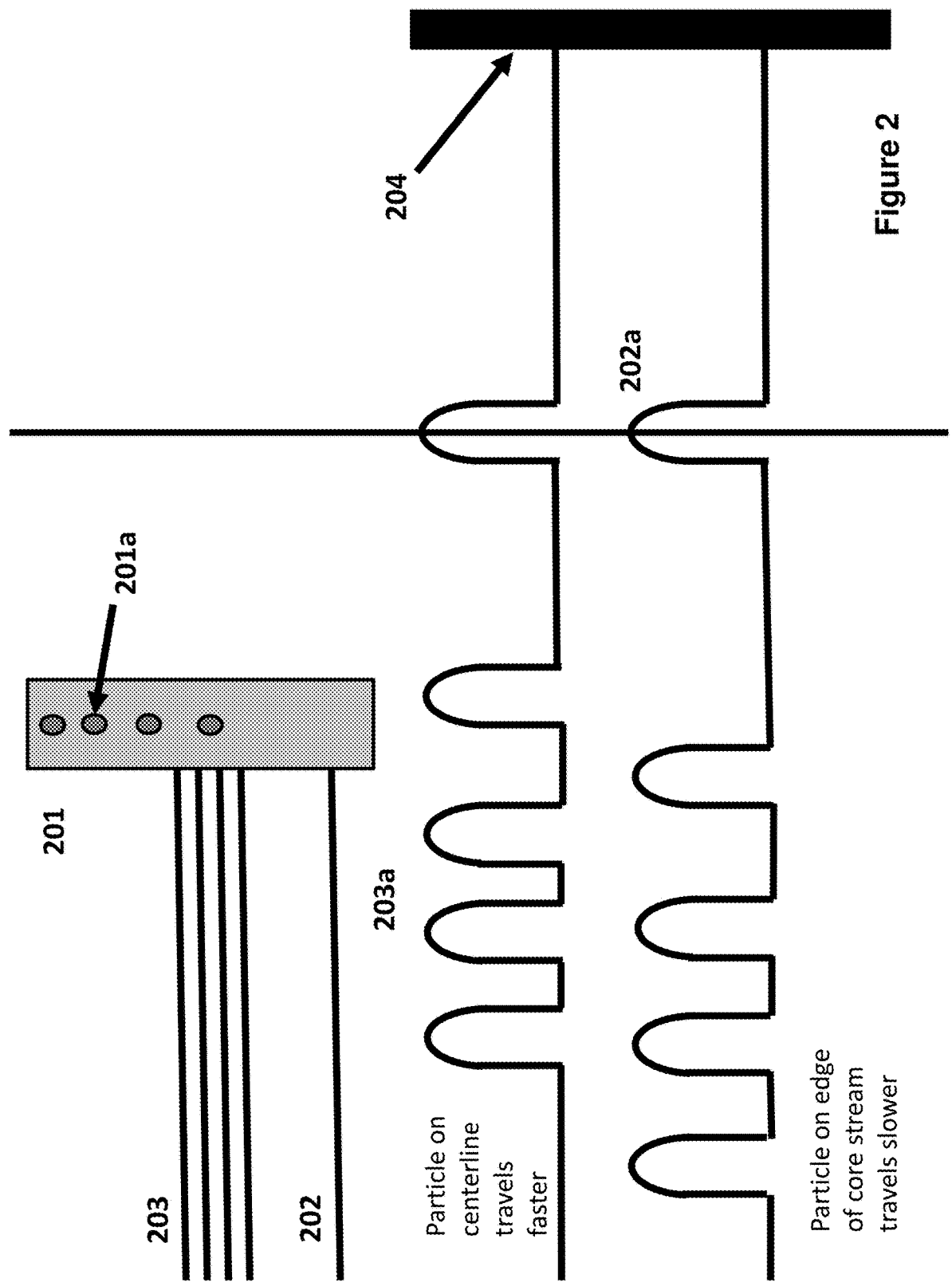
FIG. 2 depicts detecting light scatter from irradiating a distal end of a flow cell with a light system according to certain embodiments.

FIG. 2 depicts detecting light scatter from irradiating a flow cell at a distal end according to certain embodiments. Flow cell 201 with particles 201a flowing therethrough is irradiated with lasers 203 which generate pulses 203a when detected by a light scatter detector 204. Flow cell 201 is irradiated at a distal end with laser 202 to generate pulse 202a. In certain instances, pulse 202a detected with a light scatter detector can be used to adjust timing for particle sorting (such as timing for charge a particle-containing droplet)

Figure 3:
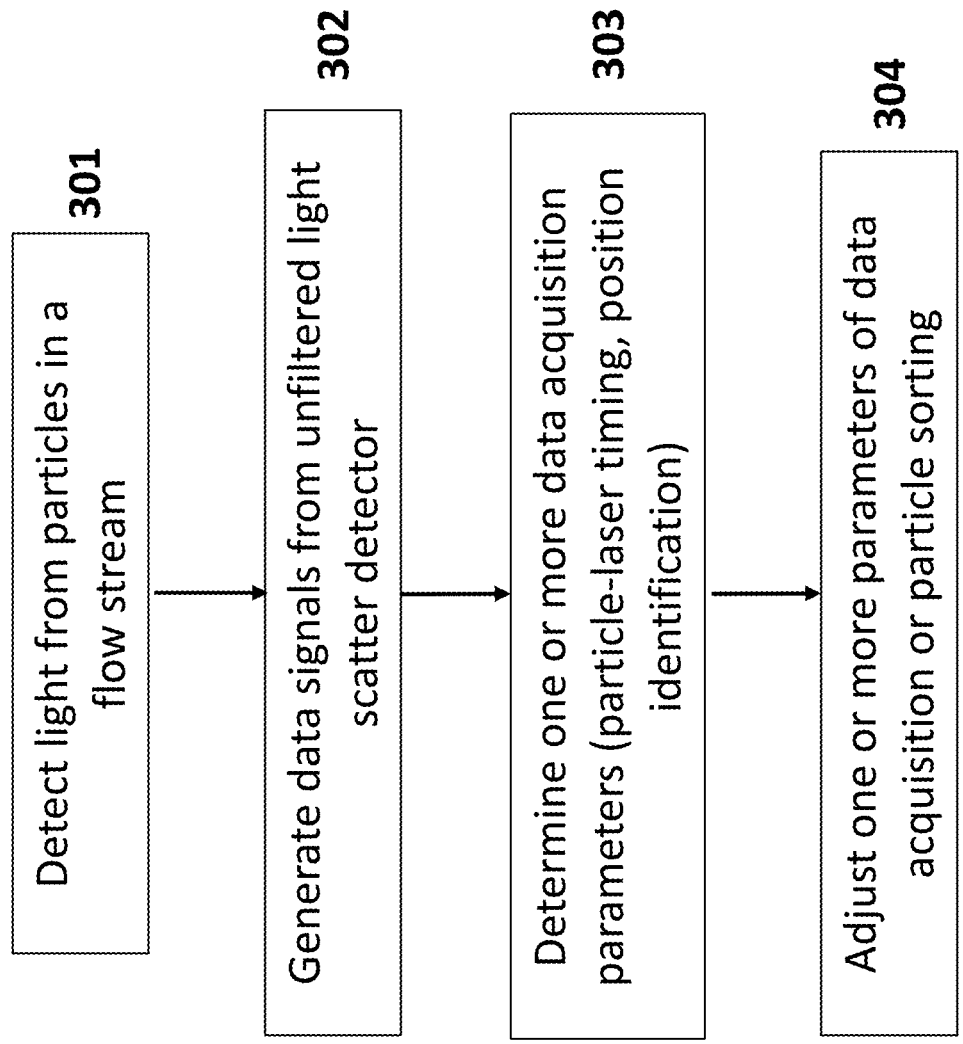
FIG. 3 depicts a flow chart for determining and adjusting one or more parameters based on generated data signals from an unfiltered light scatter detector according to certain embodiments.

FIG. 3 depicts a flow chart for determining and adjusting one or more parameters based on generated data signals from an unfiltered light scatter detector with a light detection system according to certain embodiments. At step 301, light from particles in the flow stream are detected with an unfiltered light scatter detector. One or more data signals from the unfiltered light scatter detector are generated at step 302. At step 303, one or more parameters of the light detection system is determined based on the unfiltered light scatter detector data signals. For example, particle position may be identified, flow rate of particle in the flow stream, the timing of particle crossing each laser beam and duration between the time a particle passes through each laser beam may be determined at step 303. At step 304, one or more parameters of data acquisition or particle sorting may be adjusted.

Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 14/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 254/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 μL/min to 250 μL/min, such as from 1 μL/min to 100 μL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min.

In certain embodiments, the subject systems are flow cytometric systems employing the above described light detection systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Figure 4A:
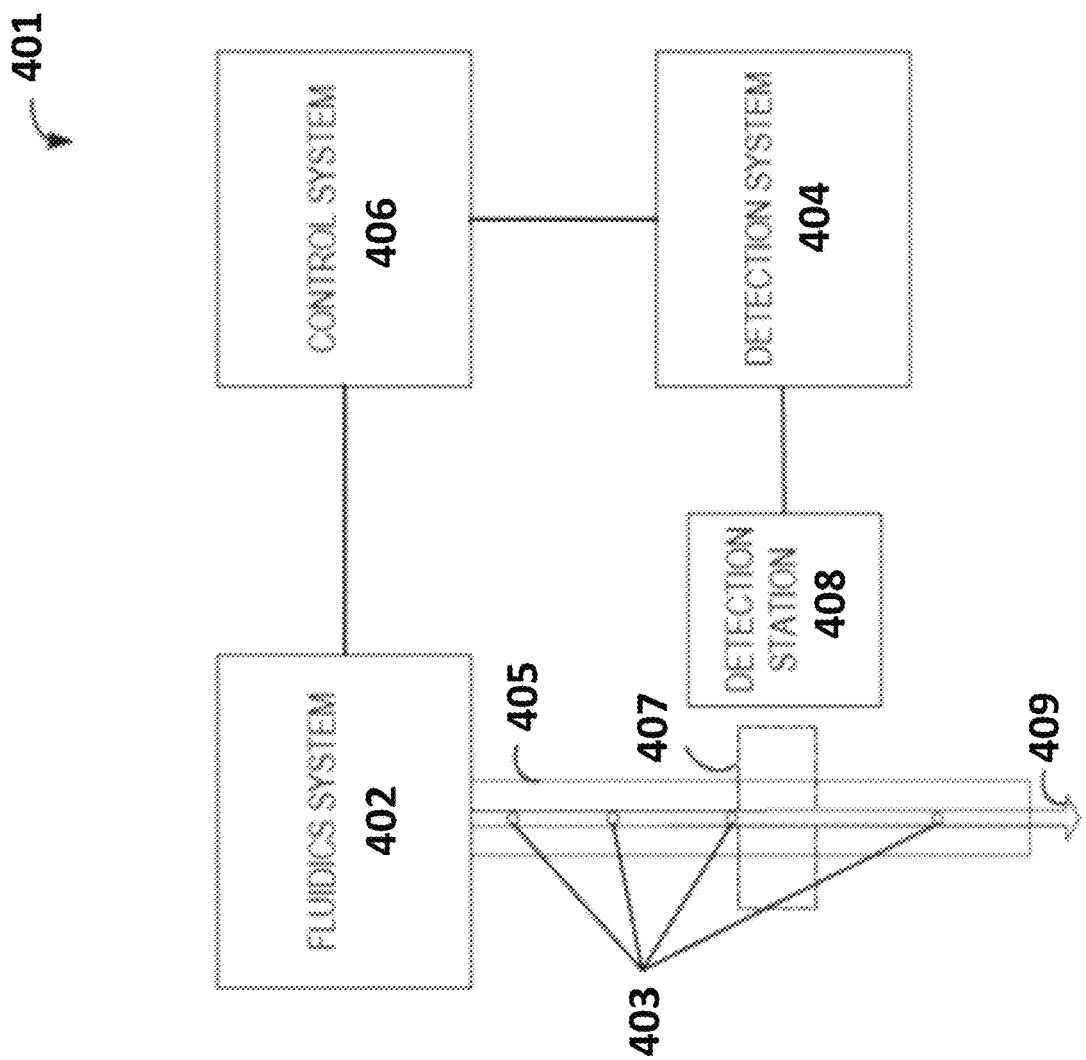
FIG. 4A depicts a functional block diagram of a particle analysis system according to certain embodiments.

In some embodiments, systems of interest include a particle analysis system which can be used to analyze and characterize particles, with or without physically sorting the particles into collection vessels. FIG. 4A shows a functional block diagram of an example of a particle analysis system. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
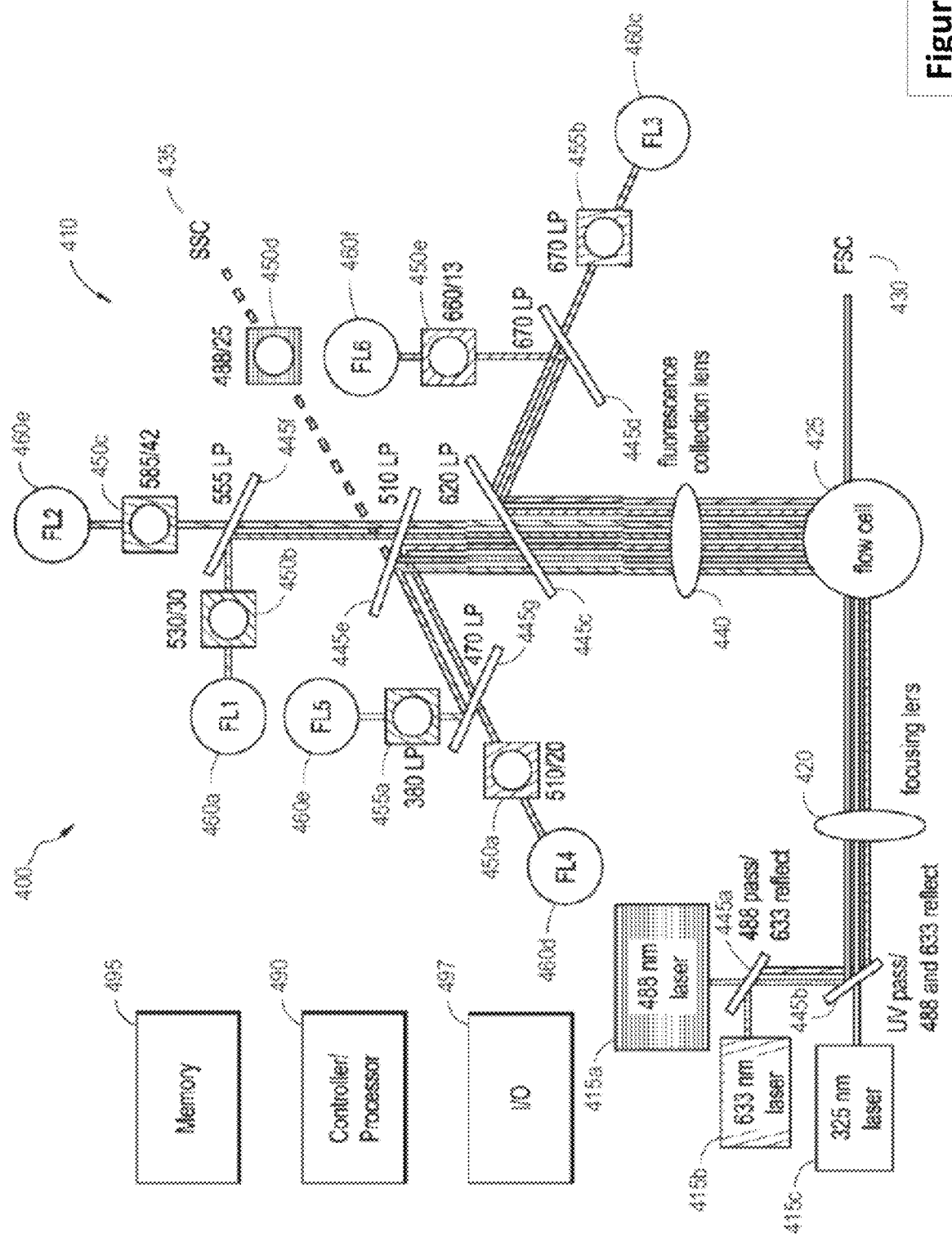
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
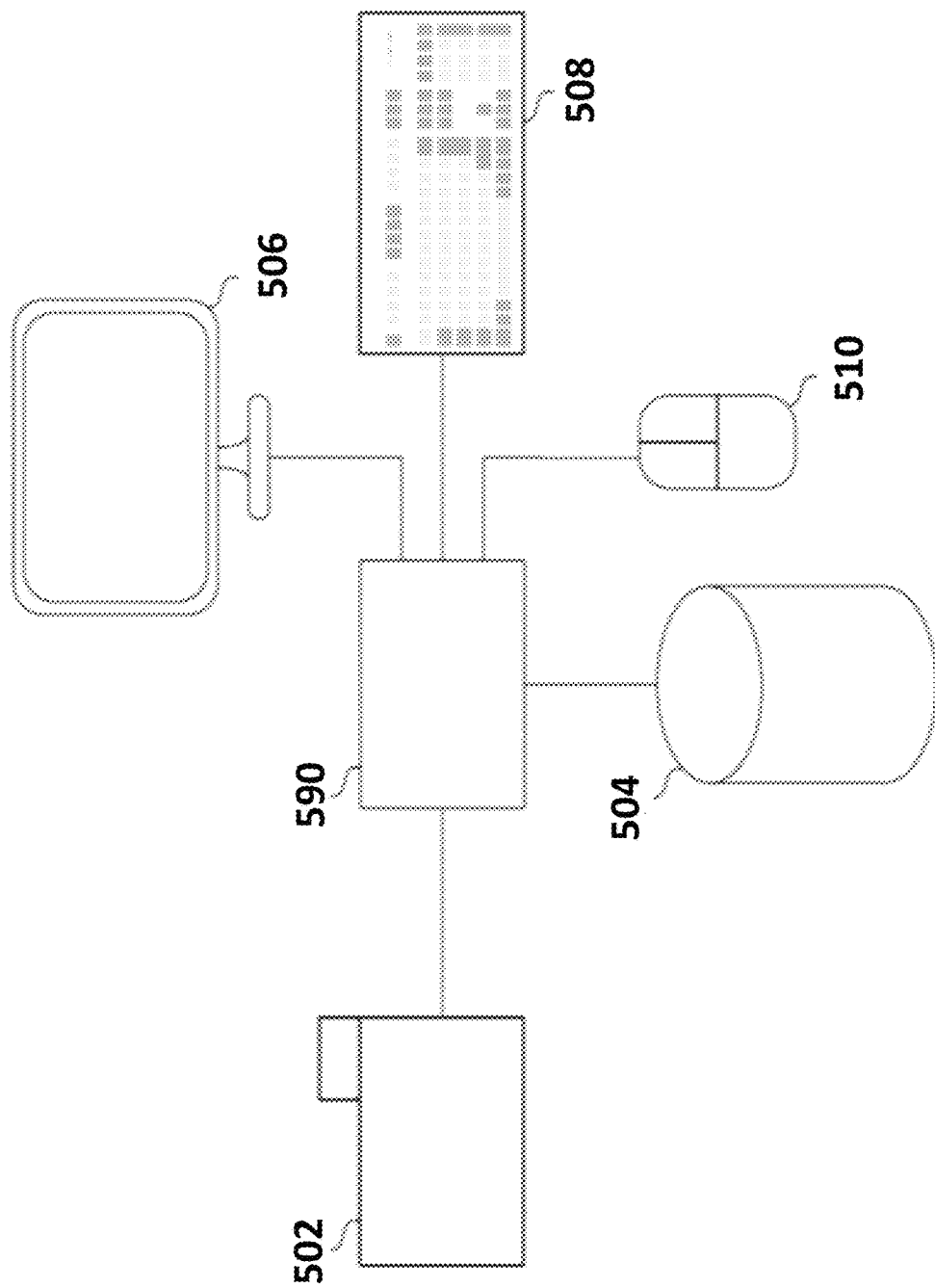
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
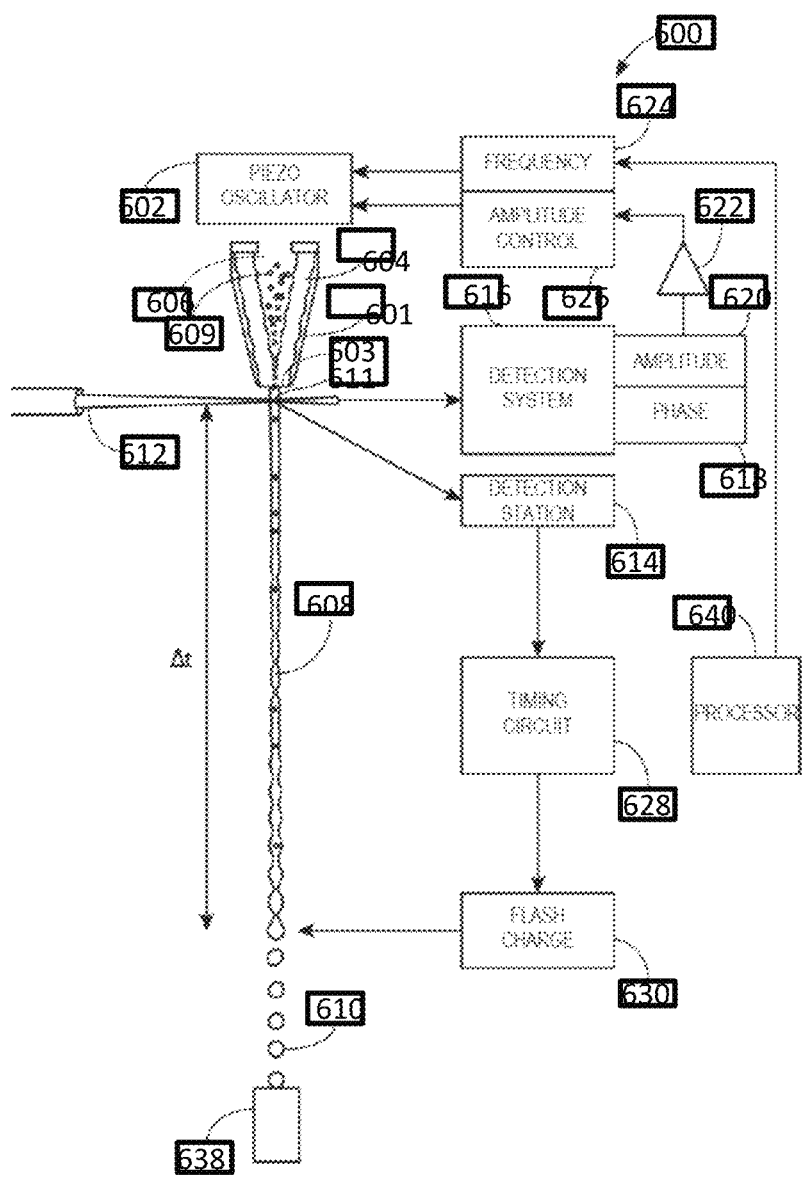
FIG. 6A depicts a schematic drawing of a particle sorter system according to certain embodiments.

In some embodiments, systems of interest include a particle sorter system. FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
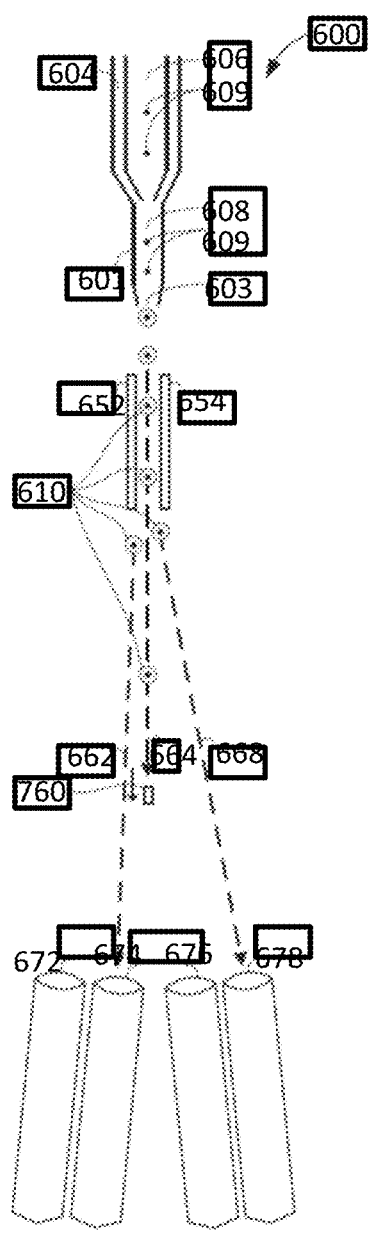
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, N.J.).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating a flow stream with a light source having two or more lasers, algorithm for detecting scattered light from the irradiated flow stream with an unfiltered light scatter detector and in certain instances, algorithm for generating a data signal from the unfiltered light scatter detector and determining one or more parameters of data acquisition based on the generated data signals from the unfiltered light scatter detector. In some embodiments, the memory includes algorithm for determining the timing of data acquisition by one or more photodetectors in the subject systems. In other embodiments, the memory includes algorithm for identifying the position of a particle in the flow stream. In yet other embodiments, the memory includes algorithm for determining the duration between light scatter by particles in the sample from each laser. In still other embodiments, the memory includes algorithm for generating one or more particle sorting parameters in response to the data signals from the unfiltered light scatter detector.

In certain instances, systems include memory having algorithm for adjusting one or more parameters of data acquisition based on the generated data signals from the unfiltered light scatter detector. In some instances, systems include memory having algorithm for changing the duration of data acquisition (i.e., data acquisition window). In other instances, systems include memory having algorithm for adjusting the timing of data acquisition. In yet other instances, systems include memory having algorithm for adjusting one or more particle sorting parameters in response to the data signals from the unfiltered light scatter detector, such as the timing for charging a particle-containing droplet. In still other instances, systems include memory having algorithm for adjusting the drop drive frequency in response to the generated data signals from the unfiltered light scatter detector. In still other instances, systems include memory having algorithm for adjusting the drop delay in response to the generated data signals from the unfiltered light scatter detector.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
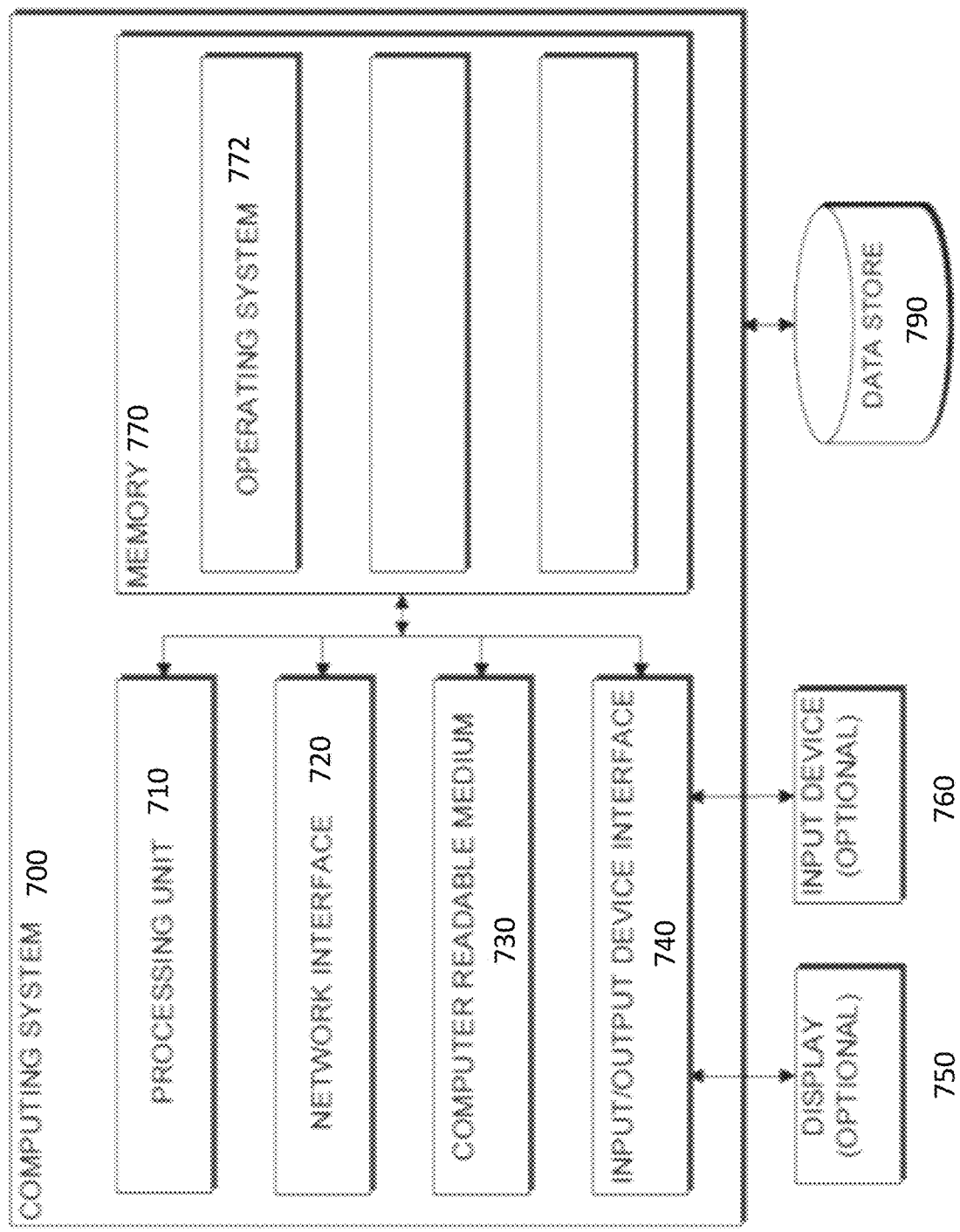
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods

Aspects of the present disclosure also include methods for determining one or more parameters of data acquisition based on generated data signals from an unfiltered light scatter detector. Methods according to certain embodiments include detecting light from a flow stream with a light detection system comprising an unfiltered light scatter detector configured to detect scattered light from a sample in a flow stream irradiated by two or more lasers; generating one or more data signals in response to scattered light from each of the two or more lasers detected by the unfiltered light scatter detector; and determining one or more parameters of data acquisition based on the generated data signals from the unfiltered light scatter detector.

Scattered light may be detected by each photodetector at an angle with respect to the incident beam of light irradiation, such as at an angle of 1° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light detector is configured to detect light from particles in the sample at an angle that is 180° or more with respect to the incident beam of light irradiation. In certain instances, one or more of the filtered and unfiltered light scatter detector is a side scatter photodetector, such as where the photodetector is positioned to detect scattered light that is propagated from 30° to 120° with respect to the incident beam of light irradiation, such as from 45° to 105° and including from 60° to 90°. In certain instances, one or more of the filtered and unfiltered light scatter detector is a side scatter photodetector positioned at an angle of 90° with respect to the incident beam of light irradiation. In other instances, one or more of the filtered and unfiltered light scatter detector is a forward scatter detector, such as where the detector is positioned to detect scattered light that is propagated from 120° to 240° with respect to the incident beam of light irradiation, such as from 100° to 220°, such as from 120° to 200° and including from 140° to 180° with respect to the incident beam of light irradiation. In certain instances, one or more of the filtered and unfiltered light scatter detector is a front scatter photodetector positioned to detect scattered light that is propagated at an angle of 180° with respect to the incident beam of light irradiation. In yet other instances, one or more of the filtered and unfiltered light scatter detector is a back scatter photodetector positioned to detect scattered light that is propagated from 1° to 30° with respect to the incident beam of light irradiation, such as from 5° to 25° and including from 10° to 20° with respect to the incident beam of light irradiation. In certain instances, one or more of the filtered and unfiltered light scatter detector is a back scatter photodetector positioned to detect scattered light that is propagated at an angle of 30° with respect to the incident beam of light irradiation.

Each light scatter photodetector in the subject light detection systems may be any suitable photosensor, such as active-pixel sensors (APSs), avalanche photodiode, image sensors, charge-coupled devices (CCDs), intensified charge-coupled devices (ICCDs), complementary metal-oxide semiconductor (CMOS) image sensors or N-type metal-oxide semiconductor (NMOS) image sensors, light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other types of photodetectors. In embodiments, the light scatter photodetector may include 1 or more photosensor, such as 2 or more, such as 3 or more, such as 5 or more, such as 10 or more and including 25 or more photosensors. In some instances, each light scatter photodetector is a photodetector array. The term "photodetector array" is used in its conventional sense to refer to an arrangement or series of two or more photodetectors that are configured to detect light. In embodiments, photodetector arrays may include 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors, such as 10 or more photodetectors, such as 12 or more photodetectors and including 15 or more photodetectors. In certain embodiments, photodetector arrays include 5 photodetectors. The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular shaped configurations. The photodetectors in a light scatter photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°.

The light scatter detectors of the present disclosure are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, the subject photodetectors are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from a sample in the flow stream at one or more specific wavelengths. In embodiments, methods include measuring light continuously or in discrete intervals. In some instances, detectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, methods include generating one or more data signals from the unfiltered light scatter detector and determining one or more parameters of data acquisition based on the generated data signals from the unfiltered light scatter detector. In some embodiments, methods include determining the timing of data acquisition by one or more photodetectors in the subject systems based on the generated data signals from the unfiltered light scatter detector. For example, the timing for data acquisition by one or more other light scatter detectors, emission photodetectors, transmission photodetectors, flow stream imaging sensors may be determined using the generated data signals from the unfiltered light scatter detector. In some embodiments, methods include identifying the position of a particle in the flow stream based on the generated data signals from the unfiltered light scatter detector. In other embodiments, method include determining the duration between light scatter by particles in the sample from each laser based on the generated data signals from the unfiltered light scatter detector. In other embodiments, methods include determining changes in the flow rate by particles in the sample based on the generated data signals from the unfiltered light scatter detector. In certain instances, methods include determining sorting parameters in response to the data signals from the unfiltered light scatter detector. In some instances, the particle sorting parameter is particle sort timing, such as timing for charging a particle-containing droplet.

In certain instances, methods include adjusting one or more parameters of data acquisition based on the generated data signals from the unfiltered light scatter detector. In some embodiments, methods include changing the duration of data acquisition (i.e., data acquisition window). In some instances, changing the duration of data acquisition includes decreasing the duration of data acquisition by 5% or more, such as by 10% or more, such as by 25% or more and including by decreasing the duration of data acquisition by 50% or more. For example, the duration of data acquisition may be decreased by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more and including by 5 µs or more.

In other embodiments, methods include changing the timing of data acquisition. In some instances, methods include instructions for adjusting the timing of data acquisition 5% or more, such as by 10% or more, such as by 25% or more and including adjusting the timing of data acquisition by 50% or more. For example, the timing of data acquisition may be adjusted by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more and including by 5 µs or more.

In certain embodiments, methods include adjusting one or more particle sorting parameters in response to the data signals from the unfiltered light scatter detector. In some instances, methods include adjusting the particle sort timing, such as the timing for charging a particle-containing droplet. In certain instances, the timing of charging a particle-containing droplet is adjusted by 5% or more, such as by 10% or more, such as by 25% or more and including adjusting the timing of charging a particle-containing droplet by 50% or more. For example, the timing of charging a particle-containing droplet may be adjusted by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more and including by 5 µs or more.

In still other embodiments, methods include adjusting the drop drive frequency in response to the generated data signals from the unfiltered light scatter detector. In some instances, the drop drive frequency is increased, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be increased by 1% or more, such as by 5% or more, such as by 10% or more, such as by 15% or more, such as by 25% or more, such as by 50% or more, such as by 75% or more and including increasing the drop drive frequency by 90% or more. In other instances, the drop drive frequency is reduced, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be reduced by 1% or more, such as by 5% or more, such as by 10% or more, such as by 15% or more, such as by 25% or more, such as by 50% or more, such as by 75% or more and including reducing the drop frequency by 90% or more.

In still other embodiments, methods include adjusting the drop delay in response to the generated data signals from the unfiltered light scatter detector. In some instances, the drop delay is increased, such as by 0.01 us or more, such as by 0.05 us or more, such as by 0.1 us or more, such as by 0.3 us or more, such as by 0.5 us or more, such as by 1 us or more, such as by 2.5 us or more, such as by 5 us or more, such as by 7.5 us or more and including increasing the drop delay by 10 µs or more. For example, the drop delay may be increased by 1% or more, such as by 5% or more, such as by 10% or more, such as by 15% or more, such as by 25% or more, such as by 50% or more, such as by 75% or more and including increasing the drop delay by 90% or more. In other instances, the drop frequency is reduced, such as by 0.01 µs or more, such as by 0.05 µs or more, such as by 0.1 µs or more, such as by 0.3 µs or more, such as by 0.5 µs or more, such as by 1 µs or more, such as by 2.5 µs or more, such as by 5 µs or more, such as by 7.5 µs or more and including reducing the drop delay by 10 µs or more. For example, the drop delay may be reduced by 1% or more, such as by 5% or more, such as by 10% or more, such as by 15% or more, such as by 25% or more, such as by 50% or more, such as by 75% or more and including reducing the drop delay by 90% or more.

FIGS. 8A and 8B illustrate adjusting data acquisition using a data signal from an unfiltered light scatter detector according to certain embodiments. FIG. 8A depicts data acquisition windows (801a, 802a, 803a, 804a) for a particle irradiated by four different lasers 801, 802, 803 and 804. As shown in FIG. 8A, time-shifting pulses by the lasers due to changes in the flow rate of the particle in the flow cell become misaligned with data acquisition windows 801a, 802a, 803a, 804a. FIG. 8B illustrates using an unfiltered light scatter detector which detects scattered light from each of lasers 801, 802, 803 and 804, the data acquisition windows can be realigned (i.e., adjusting the timing of data acquisition) with particle irradiation by each laser. In addition to adjusting the timing of data acquisition, the duration of data acquisition (i.e., the width of data acquisition windows 801a, 802a, 803a, 804a) can be reduced as depicted in FIG. 8B.

In embodiments, the particles irradiated in the flow stream may be cells, such as where the sample in the flow stream is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) having particles is irradiated with a light source having two or more lasers, such as 3 or more lasers, such as 4 or more lasers, such as 5 or more lasers, such as 10 or more laser, such as 15 or more lasers, such as 25 or more lasers and including 50 or more lasers. Depending on the components in the sample (e.g., cells, beads, non-cellular particles, etc.), the lasers may emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. Each laser may independently be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

Kits

Aspects of the present disclosure further include kits, where kits include two or more light scatter detectors, an optical filtering component and an optical adjustment component to convey light to each of the light scatter detectors. Kits may further include other optical adjustment components as described here, such as obscuration components including optical apertures, slits and obscuration discs and scatter bars. Kits according to certain embodiments also include optical components for conveying light, such as collimating lenses, mirrors, wavelength separators, pinholes, etc. Kits may also include an optical collection component, such as fiber optics (e.g., fiber optics relay bundle) or components for a free-space relay system. In some instances, kits further include one or more photodetectors, such as photomultiplier tubes (e.g., metal package photomultiplier tubes). In certain embodiments, kits include one or more components of a light beam generator, such as a direct digital synthesizer, an acousto-optic deflector, a beam combining lens and a Powell lens.

The various assay components of the kits may be present in separate containers, or some or all of them may be pre-combined. For example, in some instances, one or more components of the kit, e.g., two or more light scatter detectors are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods and light detection systems find use where the characterization of a sample by optical properties, in particular where identification and differentiation of cells in a sample, is desired. In some embodiments, the systems and methods described herein find use in flow cytometry characterization of biological samples. In certain instances, the present disclosure finds use in enhancing measurement of light collected from a sample that is irradiated in a flow stream in a flow cytometer. Embodiments of the present disclosure find use where enhancing the effectiveness of measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system comprising:
a light source comprising two or more lasers;
a light detection system comprising an unfiltered light scatter detector configured to detect forward scattered light from a sample in a flow stream irradiated by the two or more lasers; and
a processor comprising memory operably coupled to the processor wherein the memory comprises instructions stored thereon, which when executed by the processor, cause the processor to:
generate one or more data signals in response to forward scattered light from each of the two or more lasers detected by the unfiltered light scatter detector; and
determine one or more parameters of data acquisition based on the generated data signals from the unfiltered light scatter detector, wherein the one or more parameters of data acquisition comprises timing of particle irradiation by each of the two or more lasers.

2. The system according to claim 1, wherein the memory further comprises instructions which when executed by the processor, cause the processor to adjust the one or more parameters of data acquisition based on the generated data signals from the unfiltered light scatter detector.

3. The system according to claim 2, wherein adjusting one or more parameters of data acquisition comprises adjusting data acquisition duration.

4. The system according to claim 3, wherein adjusting data acquisition duration comprises decreasing the duration of data acquisition.

5. The system according to claim 1, wherein the memory further comprises instructions which when executed by the processor, cause the processor to identify a position of a particle in the flow stream in response to the generated data signals from the unfiltered light scatter detector.

6. The system according to claim 5, wherein the memory further comprises instructions which when executed by the processor, cause the processor to generate one or more particle sorting parameters in response to the data signals from the unfiltered light scatter detector.

7. The system according to claim 6, wherein the one or more particle sorting parameters comprises particle sort timing.

8. The system according to claim 1, further comprising a flow cell for propagating the sample in the flow stream.

9. The system according to claim 8, wherein the flow cell comprises a proximal end and a distal end and the light source is configured to irradiate the sample in the flow stream at the distal end of the flow cell with one of the lasers.

10. The system according to claim 8, wherein the memory comprises instructions which when executed by the processor, cause the processor to generate one or more particle sorting parameters in response to data signals generated by the unfiltered light scatter detector in response to light scattered by irradiation with the laser at the distal end of the flow cell.

11. The system according to claim 10, wherein the one or more particle sorting parameters comprises particle sort timing.

12. The system according to claim 1, wherein the light source comprises four or more lasers.

13. The system according to claim 1, further comprising a filtered light scatter detector configured to detect light scattered by the sample from one of the lasers of the light source.

14. The system according to claim 13, wherein the filtered light scatter detector comprises:
a light scatter detector; and
an optical adjustment component that is configured to convey light scattered by the sample from the one laser to the light scatter detector.

15. The system according to claim 14, wherein the optical adjustment component comprises a bandpass filter.

16. The system according to claim 13, wherein the light detection system comprises an optical adjustment component configured to convey the scattered light from the sample to the unfiltered light scatter detector and to the filtered light scatter detector.

17. The system according to claim 16, wherein the optical adjustment component comprises a beam splitter.

18. The system according to claim 17, wherein the optical adjustment component comprises a wedged beam splitter.

* * * * *